April 15, 1930. H. RICHARDSON 1,754,572
BALE TIER
Filed Jan. 18, 1928    10 Sheets-Sheet 1
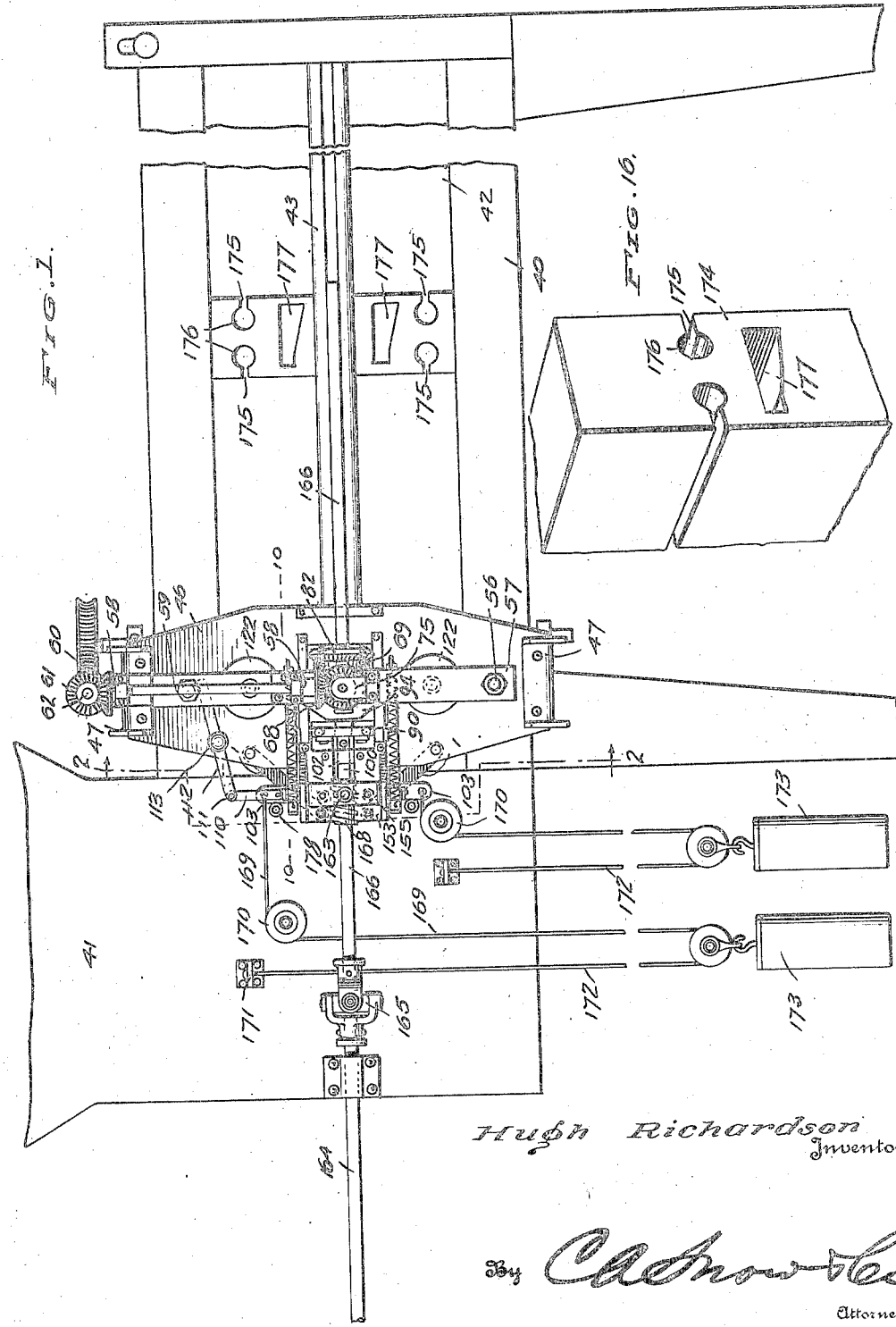
Hugh Richardson
Inventor
By Chow & Co.
Attorneys.

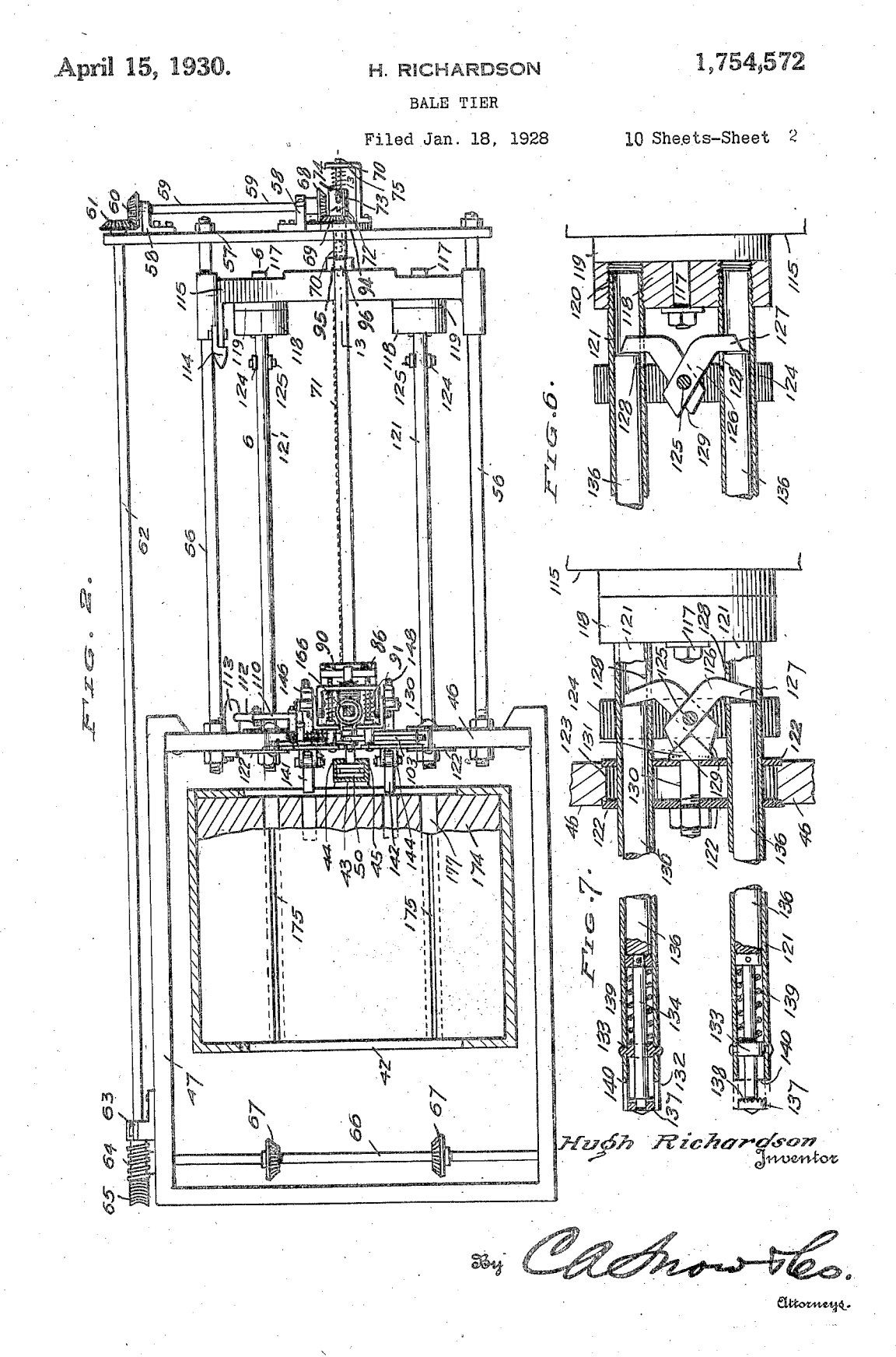

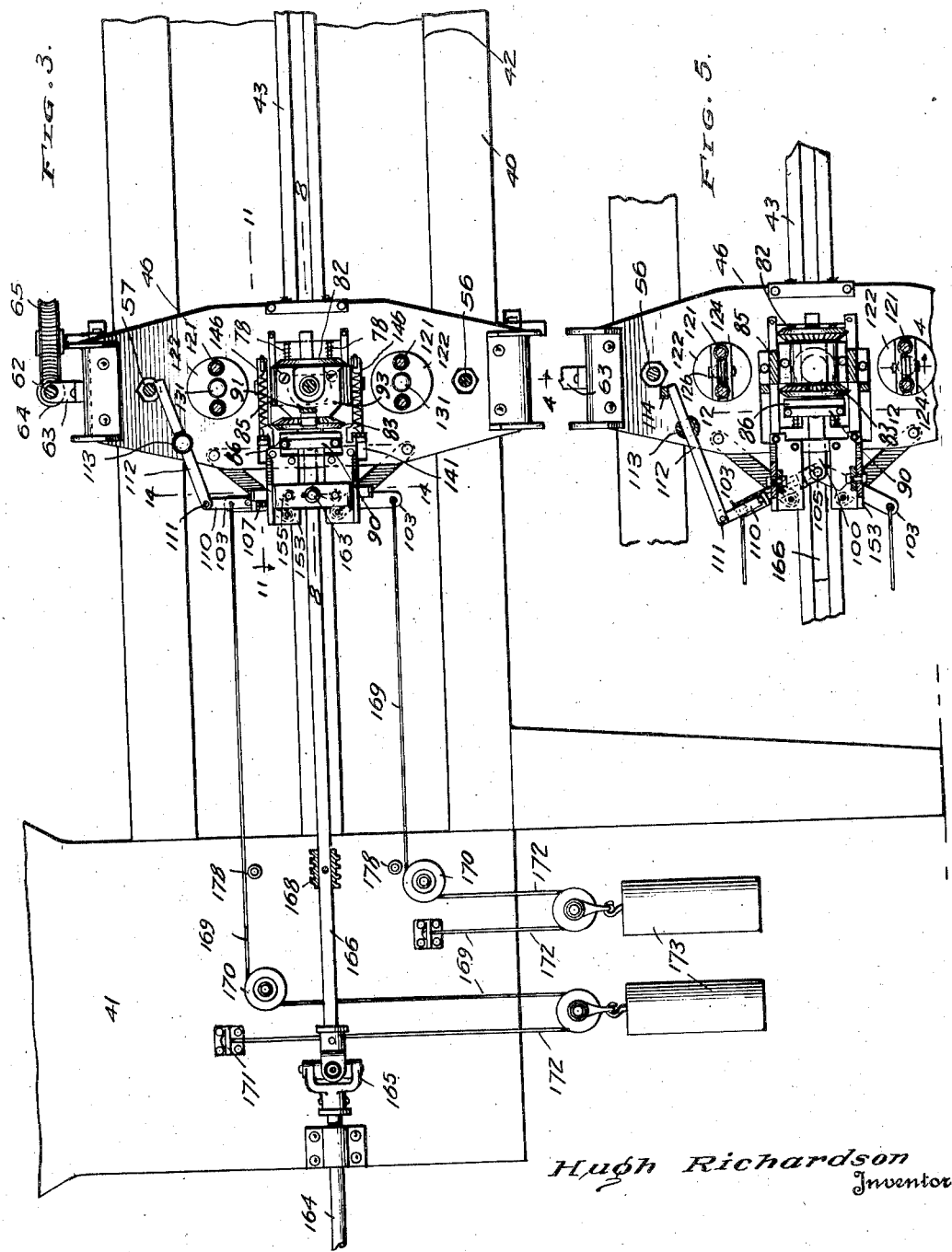

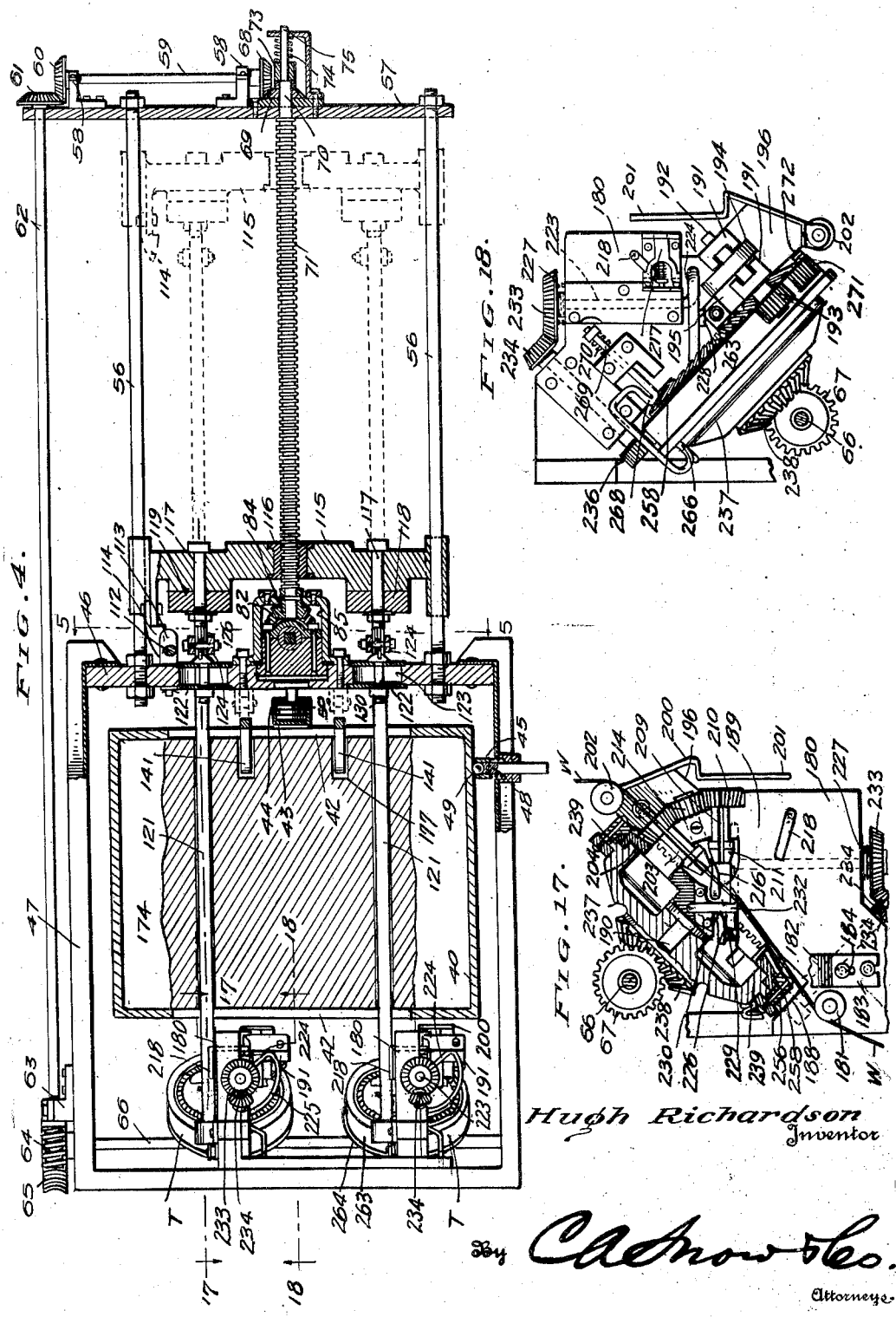

April 15, 1930.  H. RICHARDSON  1,754,572
BALE TIER
Filed Jan. 18, 1928  10 Sheets-Sheet 5

Hugh Richardson
Inventor

By C. A. Snow & Co.
Attorneys

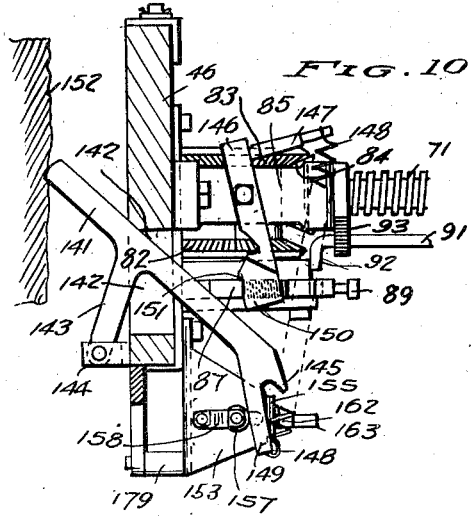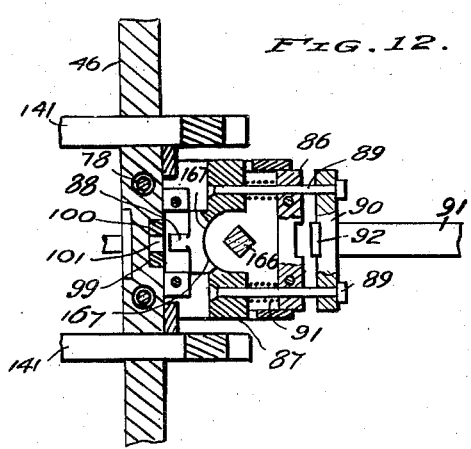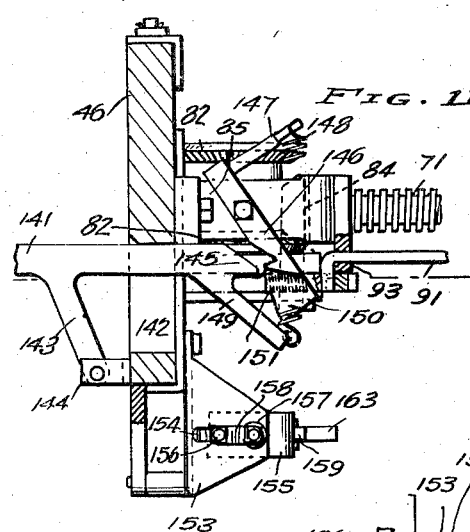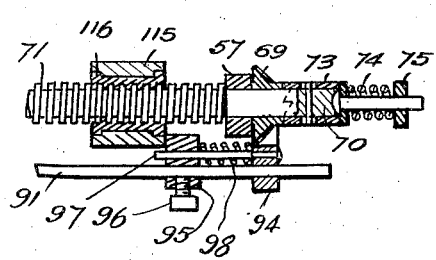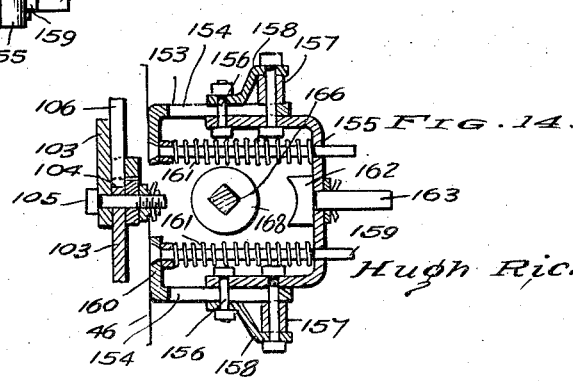

April 15, 1930. H. RICHARDSON 1,754,572
BALE TIER
Filed Jan. 18, 1928 10 Sheets-Sheet 7
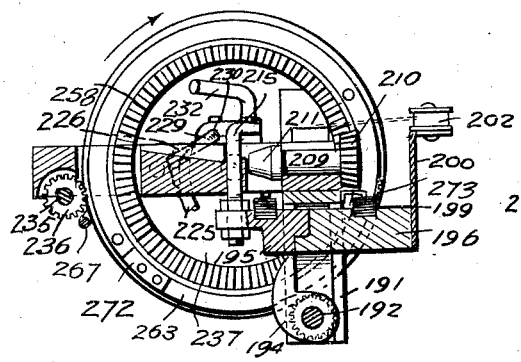
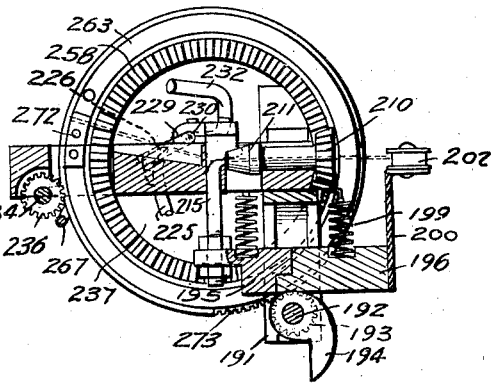
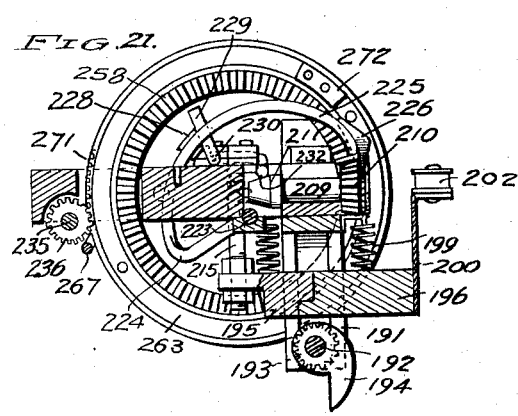
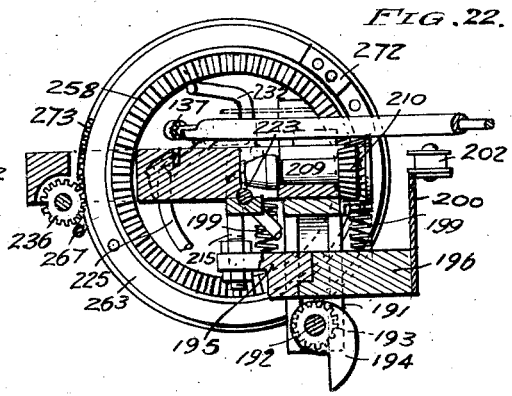
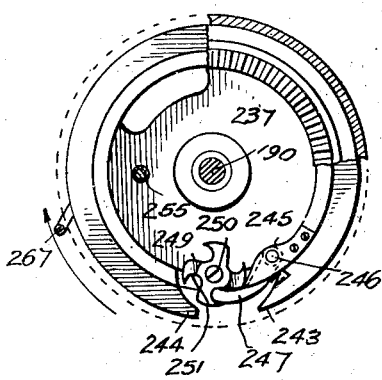
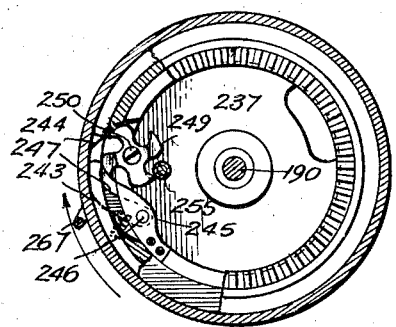
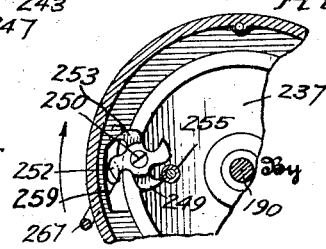
Hugh Richardson Inventor

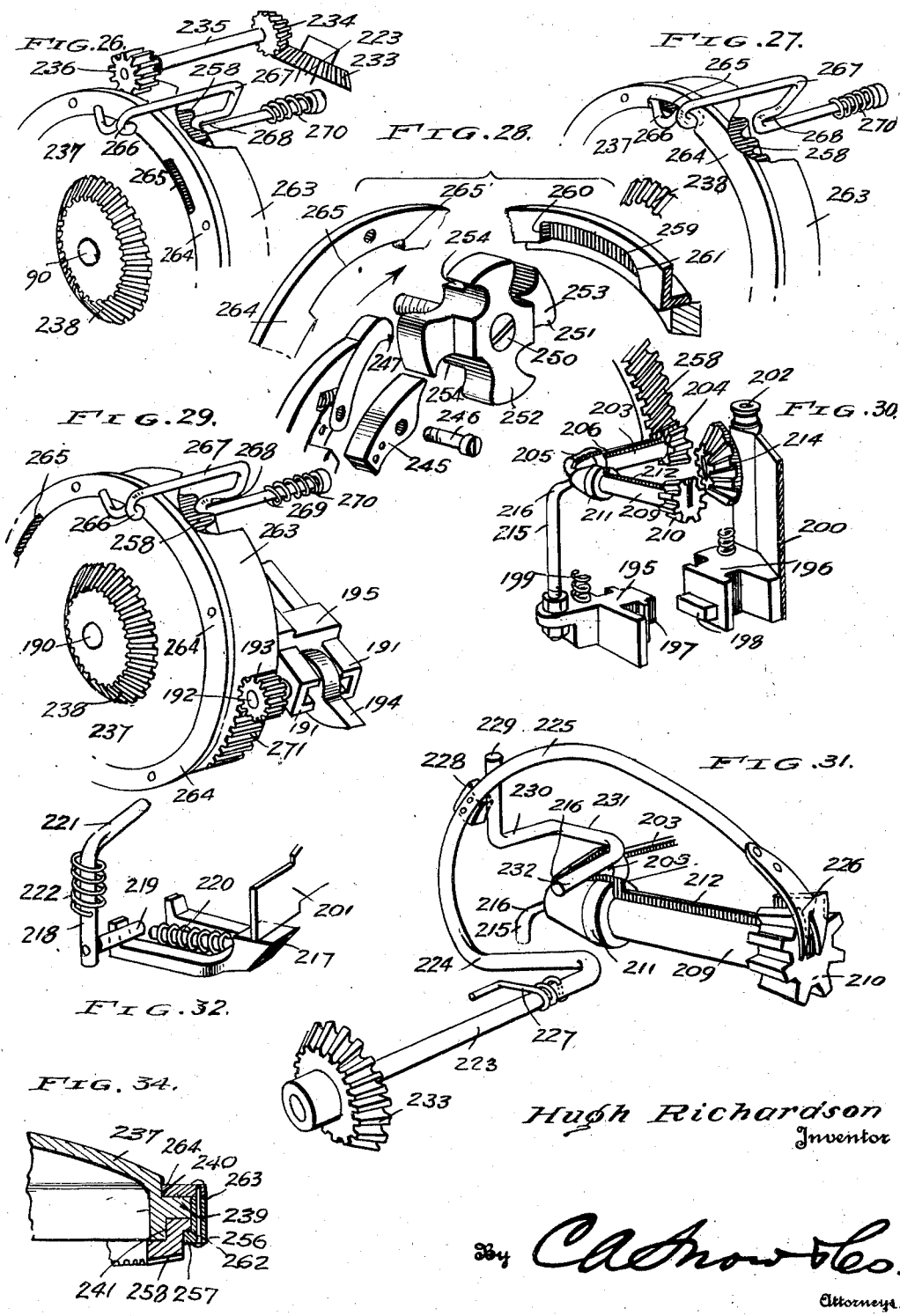

April 15, 1930.  H. RICHARDSON  1,754,572
BALE TIER
Filed Jan. 18, 1928   10 Sheets-Sheet 9
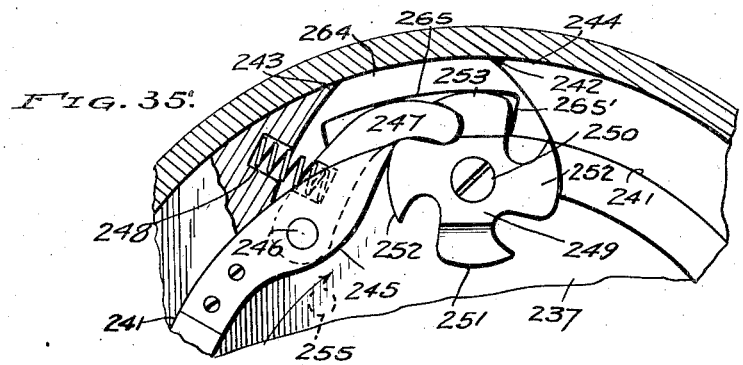
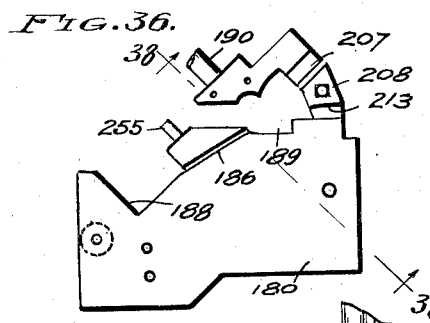
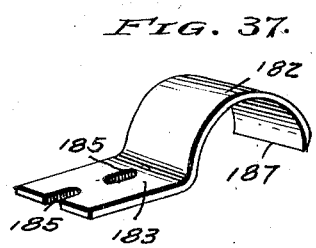
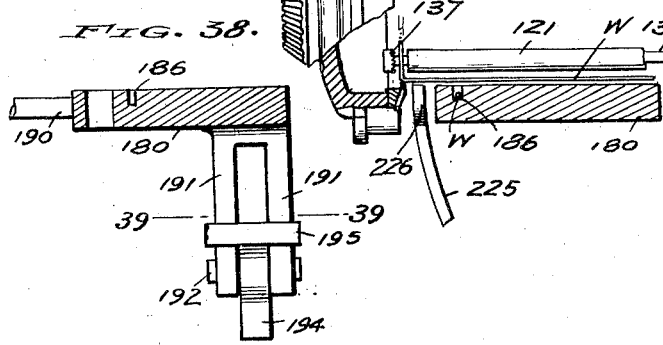
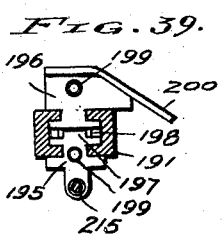
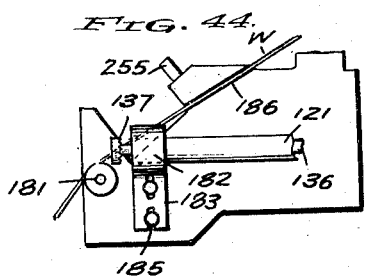
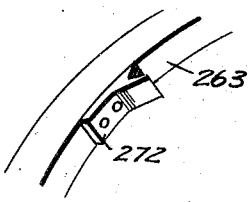
Hugh Richardson
Inventor
By C.A.Snow&Co.
Attorneys.

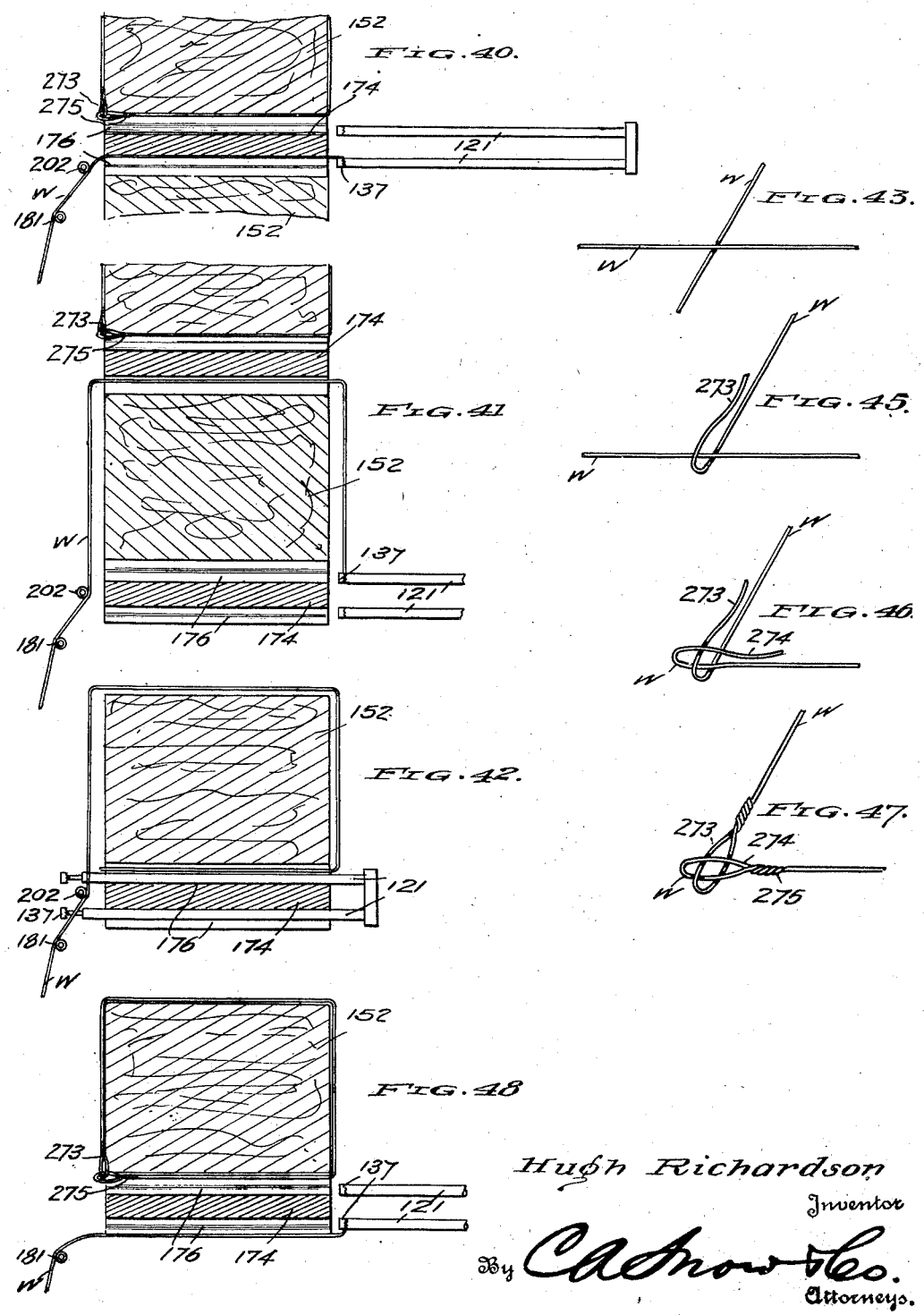

Patented Apr. 15, 1930

1,754,572

UNITED STATES PATENT OFFICE

HUGH RICHARDSON, OF NELSON, MISSOURI

BALE TIER

Application filed January 18, 1928. Serial No. 247,652.

This invention relates to baling presses and more particularly to mechanism whereby the bales as they are successively formed under pressure, will be automatically tied.

One of the objects of the invention is to provide tying mechanism which will operate to connect the ends of each tie wire by linking them together, thereby affording a stronger connection than is possible where the ends are held together solely by twisting.

Another object is to provide tying mechanism mounted to travel bodily relative to the baler, means being employed for automatically coupling it to each dividing block after the same has been positioned back of a bale subsequently to the compression of a sufficient amount of material to form the bale.

Another object is to provide tying mechanism utilizing needles mounted in a novel manner and of new and novel construction cooperating with a twisting mechanism by means of which the terminals of the tie can be properly interengaged and secured.

Another object is to provide means for automatically directing the needles through the dividing block from one side to the other of the machine at the proper time during the tying operation, thereby to feed the tie wire within the dividing block to the twisting mechanism.

Another object is to provide tying mechanism which, during the compression of material against the dividing block, will travel with said block until the bale has reached desired proportions whereupon said mechanism will be returned to its initial position, to be coupled to another dividing block preparatory to the formation of another bale.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a side elevation of a portion of a baling press having the present improvements combined therewith, the tying mechanism being shown at its initial or starting position.

Figure 2 is a section on line 2—2, Figure 1, the needles being retracted and the twisting mechanism removed.

Figure 3 is a view similar to Figure 1 showing the tying mechanism shifted away from normal position during the formation of a bale.

Figure 4 is a vertical transverse section through the tying mechanism and the baler, said section being taken approximately on the line 4—4, Figure 5.

Figure 5 is a section on line 5—5, Figure 4.

Figure 6 is a section through one end portion of the needles of one pair showing the parts in their normal positions when retracted, being taken on the line 6—6, Figure 2.

Figure 7 is a view showing, in section, the needles of one pair in the positions assumed thereby when projected for cooperation with the twisting mechanism.

Figure 10 is an enlarged section on line 10—10, Figure 1 showing the relative positions of the parts nearest the baling chamber prior to the coupling of the tying mechanism to a dividing block.

Figure 11 is a view similar to Figure 10 showing the positions of the parts when coupled to the dividing block, said figure being on the line 11—11 Figure 3.

Figure 12 is a section taken on line 12—12, Figure 5, the locking bolt being retracted from the position shown in Figure 8.

Figure 13 is a section on line 13—13, Figure 2, showing that portion of the tying mechanism at the end of the feeding screw remote from that on which the mechanism of Figure 11 is located.

Figure 14 is a section on line 14—14, Figure 3.

Figure 16 is a perspective view showing one end portion of the dividing block.

Figure 17 is a section through the twisting mechanism taken on the line 17—17, Figure 4, showing needles cooperating therewith.

Figure 18 is a section on line 18—18, Figure 4 showing the twisting mechanism in bottom plan.

Figure 19 is a front elevation of the twisting mechanism showing the positions of the parts prior to the twisting operation.

Figure 20 is a similar view showing the relative positions of the parts during an intermediate stage of the twisting operation.

Figure 21 is a similar view showing the relative positions of the parts at a later stage of the operation.

Figure 22 is a similar view showing the relative positions of the parts during the completion of the twisting operation.

Figure 23 is a view partly in elevation and partly in section of a portion of the twisting mechanism, parts being broken away.

Figure 24 is a similar view showing said parts shifted to another position.

Figure 25 is a similar view of a portion of said parts showing another position thereof.

Figure 26 is a perspective view of a portion of the twisting mechanism showing the latch thereof in one position.

Figure 27 is a similar view showing another position of the latch.

Figure 28 is a perspective view of certain parts of the twisting mechanism separated.

Figure 29 is a perspective view of a portion of the twisting mechanism.

Figure 30 is a perspective view of one of the twisting gears and adjacent parts.

Figure 31 is a perspective view of the other twisting gear and adjacent parts.

Figure 32 is a perspective view of the latch controlling the wire depressing blade a portion of which is shown in said figure.

Figure 33 is a perspective view of one end portion of one of the needle housings.

Figure 34 is a section through a portion of the disk and rings forming a part of the twisting mechanism.

Figure 35 is a side elevation of a portion of the twisting mechanism showing, properly assembled, the parts illustrated in Figure 28.

Figure 36 is a plan view of the table supporting the twisting mechanism.

Figure 37 is a perspective view of the arcuate wire severing blade.

Figure 38 is a section through a portion of the table, said section being taken substantially on the line 38—38, Figure 36.

Figure 39 is a transverse section through the hanger on line 39—39, Figure 38, the slides being shown in engagement with said hanger.

Figure 40 is a view in diagram showing the relative positions of the needles and dividing block immediately following the withdrawal of the needles from the block following the formation of a bale.

Figure 41 is a view similar to Figure 40 showing the relative positions of the tie wire, needles and dividing block immediately prior to the movement of the needles into the block to tie the bale.

Figure 42 is a view in diagram showing substantially the relative positions of the needles, tie wire and dividing block on the completion of the advance movement of the needles through the block.

Figure 43 is a diagram showing the relative positions of the end portions of the tie wire when the needles reach the positions shown in Figure 42.

Figure 44 is a view more or less in diagram showing the relative positions of the cutting blades, tie wire, and one of the needles before the wire is severed.

Figure 45 is a view showing the relative positions of the end portions of the tie wire following the first stage of the twisting operation.

Figure 46 is a similar view showing the relative positions of the parts following the second stage of the twisting operation.

Figure 47 is a similar view showing the relative positions of the wire ends upon the completion of the twisting operation.

Figure 48 is a view in diagram showing the positions of the needles, tie wire and bale following the completion of the bale and retraction of the needles.

Figure 49 is a perspective view of the forked block and a portion of the ring carrying it.

Figure 50 is a view partly in section and partly in elevation showing one end of the tie wire released from its needle.

Figure 8:
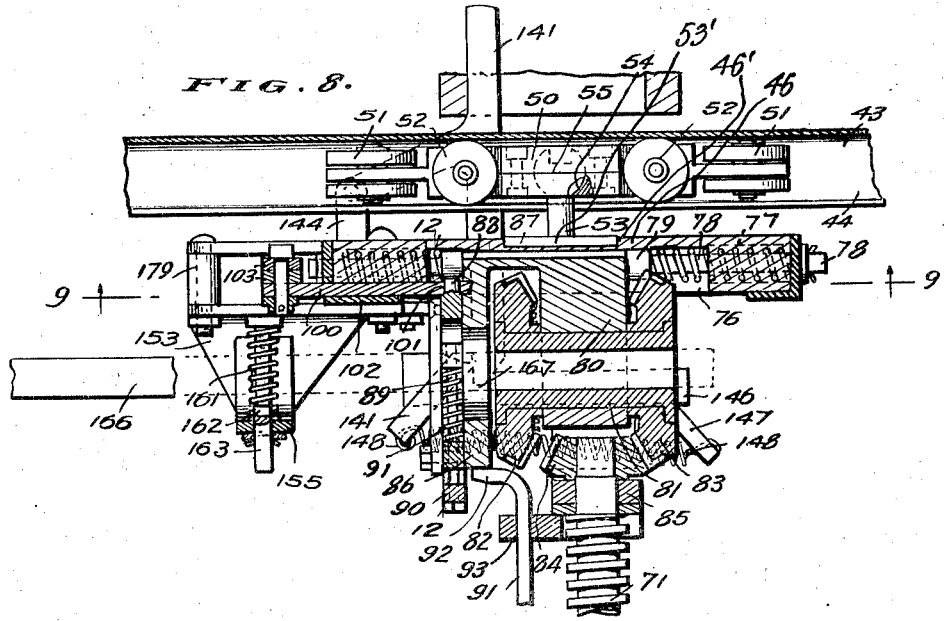
Figure 8 is an enlarged section on line 8—8, Figure 3.

Referring to the figures by characters of reference 40 designates the frame or body structure of the baling press. The plunger used for compressing material therein and the mechanism for operating the plunger have not been shown because they constitute no part of this invention. The wall of the compression chamber has been indicated at 41 and the body structure 40 is open at the sides as shown at 42. Arranged along one open side of the body 40 is a channeled guide rail 43 having longitudinal flanges 44 turned toward each other, and another guide rail 45 is extended longitudinally along the bottom of the body 40. A frame member 46 is arranged substantially vertically at said open side of the body 40 and has a yoke 47 secured at its ends to the ends of the frame. This yoke extends around and is spaced from body 40 and carried by the lower portion of the yoke is a shoe 48 carrying anti-friction elements 49 such as balls, adapted to travel within the guide rail 45.

A carriage 50 is mounted to travel in the flanged rail 43 and has wheels 51 for engaging the top and bottom portions of the rail and additional horizontally disposed wheels 52 for engaging the flanges 44 and the inner side walls of the rail. The carriage is connected to the frame member 46 by any suitable means such as a stem 53 having a ball and socket connection with the carriage as indicated at 54 in Figure 8. The other end of the stem has an angular head 53' slidable in a groove 46' formed in the frame member 46. Thus the block can move to any necessary angle relative to the frame member during the compressing operation.

Guide rods 56 are fixedly secured to the end portions of the frame member 46 and are extended laterally therefrom at right angles to the frame member. The outer ends of these guide rods serve to support the outer frame member 57 having bearings 58 in which is journaled a shaft 59. A gear 60 is secured to the outer end of this shaft and meshes with a gear 61 secured to a shaft 62 journaled in the upper end of the frame member 57 and in a bracket 63 carried by the top of the yoke 47. A worm 64 is secured to this shaft 62 and meshes with a worm gear 65 secured to the upper end of a shaft 66. This shaft is journaled in the top and bottom of yoke 47 and, in the structure illustrated, is provided with two beveled gears 67. One of these gears is provided for each twisting mechanism and serves to drive the said mechanism. As two gears are illustrated it will be understood that two twisting mechanisms are used but this number can be increased or reduced according to the number of ties to be secured about the formed bale.

At the other end of shaft 59 there is secured a beveled gear 68 which meshes with a gear 69 mounted for rotation on a stem 70 which projects from a feed screw 71. Gear 69 has a clutch sleeve 72 integral therewith and this sleeve normally engages a clutch sleeve 73 which is slidable on but rotatable with the stem 70 and is held normally pressed in engagement with sleeve 72 by a spring 74. This spring bears against a bracket 75 secured to the frame member 57 as shown particularly in Figure 4.

The frame member 46 has a central longitudinal groove 76 provided, in each end wall, with bores 77. See Figures 8 and 9. In each of these bores is mounted a spring pressed plunger 78 having a head 79 at its inner end mounted for movement within the recess 76. Interposed between the heads 79 so as to be normally centered thereby within the recess 76 is a slide 80 in which is journaled a sleeve 81 having oppositely disposed beveled gears 82 and 83 at the respective ends thereof. Interposed between these gears is a beveled gear 84 secured to one end of the feed screw 71 and this feed screw is journaled in a yoke 85 which straddles gear 84 and the slide 80 and is fixedly secured to the frame member 46 as shown particularly in Figure 4. Obviously when the slide 80 is held in centered position by the spring pressed plungers 78 the two gears 82 and 83 will be held out of mesh with gear 84.

Figure 9:
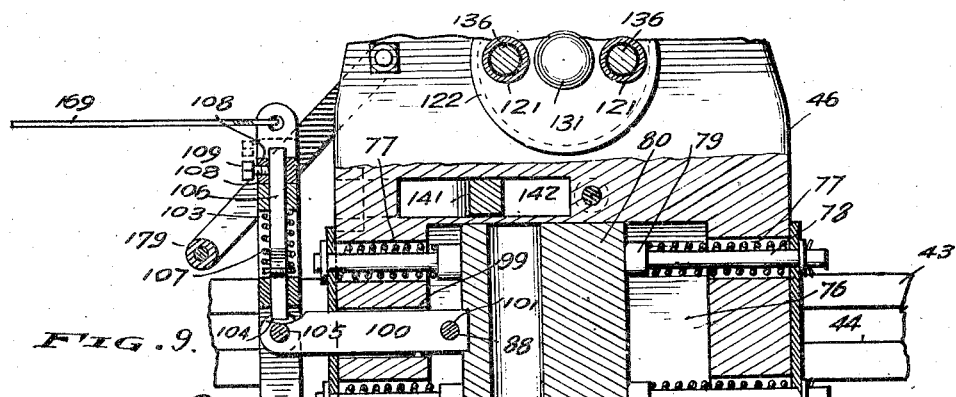
Figure 9 is a section on line 9—9, Figure 8.

Extending from the slide 80 adjacent gear 82 is an arm 86 in which is slidably mounted a cross head 87 having a locking bolt 88 projecting therefrom toward the frame member 46. Rods 89 connect this cross head to a head 90 which is held normally pressed against arm 86 by springs 91 interposed between cross head 87 and one end of the arm 86. However, when the head 90 is pulled away from the arm 86 as shown in Figure 12 the springs 91 are placed under compression and the bolt 88 is pulled away from frame member 46. For the purpose of actuating the head 90 at the proper time during the actuation of the mechanism there is provided a shifting bar 91 having a foot 92 at one end which is positioned away from the head 90 but pointed in the direction thereof as shown in Figure 8. This shifting bar is slidably mounted in a guide 93 extending from the yoke 85 and it is also slidably mounted in a guide 94 extending from the outer frame member 57. A sleeve 95 is adjustably mounted on the bar 91 and adapted to be held in any desired position relative thereto by a set screw 96 or the like. See Figure 13. Sleeve 95 is slidably mounted on guide pin 97 extending from guide 94 and a spring 98 is mounted on this pin and servies to hold the foot 92 of the shifting bar 91 normally pressed against arm 86 as shown in Figure 8 and Figure 10.

Figure 15:
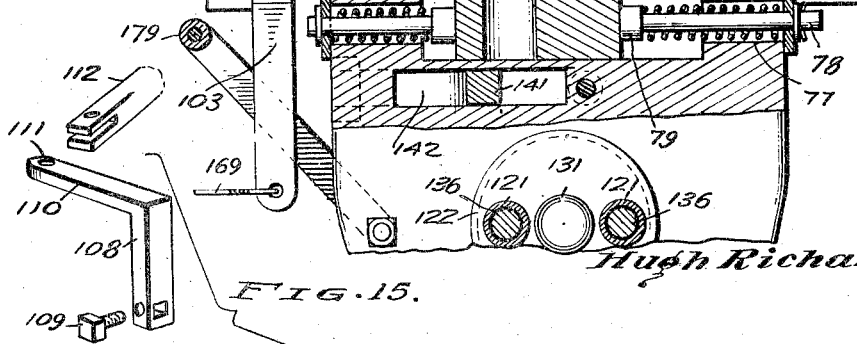
Figure 15 is a perspective view showing parts of the tying mechanism separated.

The frame member 46 is provided with a longitudinal groove 99 opening at one end into the recess 76 and through that side of the frame member nearest the compression chamber. In this groove is mounted a coupling slide 100 the inner end of which is adapted to work across the path of the bolt 88 and has an opening 101 designed to receive the bolt 88 when brought to position in alinement therewith. This coupling slide is held in the groove by any suitable means, such as a retaining plate 102 and pivotally connected to the outer end of the coupling slide are oppositely extended levers 103. As shown particularly in Figure 9 one of these levers is provided with a notch 104 in that end thereof nearest its pivot 105. The other lever has a bolt 106 slidably mounted therein and provided with a spring 107. This spring controlled bolt is so located that when the two levers are brought into substantial alinement, the bolt will be automatically projected into the notch 104, thereby holding the levers against independent movement about the pivot 105. The outer end of the bolt 106 has an arm 108 adjustably connected thereto by a set screw 109 or the like. A lateral extension 110 is provided on this arm and is pivotally connected at 111 to one end of a lever 112. In Figure 15 these parts have been illustrated in detail. Lever 112 is slidably mounted in a pin 113 which is secured to but mounted for rotation on the frame member 46. The free end of this lever projects between the guide rods 56 and into the path of a tapered deflector 114 extending from one end of a cross head 115 slidably mounted on the guide rods 56. This cross head has an interiorly screw threaded sleeve 116 fixedly mounted in the center portion thereof through which the screw 71 extends. Thus as this screw is rotated the cross head 115 will be fed along the guide rods 56 toward or from the frame member 48. In Figure 4 the cross head has been shown by broken lines in normal position and, by full lines, in its other extreme position.

Secured to the cross head 115 adjacent each end is a stud 117 on which a disk 118 is mounted to rotate freely. A boss 119 is preferably formed on the cross head 115 so that the stud 117 can be extended through the center thereof and this boss constitutes a thrust bearing for the disk. Screw threaded recesses 120 are formed in the disk 118 at diametrically opposed points and seated in each of these recesses is the screw threaded end of a tubular needle housing 121. These housings are parallel and are of such length that, when the cross head 115 is in the position indicated by full lines in Figure 4, they will extend transversely through the body structure of the press and beyond the far side thereof. For the purpose of maintaining these tubular needle housings in proper positions relative to each other, the two needle housings extended from each disk 118 are slidably mounted within connected disks 122 rotatably mounted on the frame member 46. These disks constitute closures for openings 123 formed in the frame member 46 and when each pair of needle housings 121 is rotated about the stud 117 with disk 118, the disks 122 will also be rotated therewith about the central axis thereof.

The tubular needle housings 121 of each pair are connected near the disk 118 by clamping strips 124 which bind upon said tubular housing, a bolt 125 being used for drawing them toward each other. This bolt also constitutes the pivot of opposed crossed levers 126. Each lever has a long arm and a short arm. The long arm is offset at an angle to provide a finger 127 and these fingers project into short longitudinal slots 128 formed in the respective tubular housings 121 close to the disk 118. The short arms of the two levers cooperate to form a small V-shaped recess 129 when the levers are in their normal positions as shown in Figure 6. Secured to the centers of the disks 122 through which the pair of tubular housings is extended, is a connecting bolt 130 which serves to hold the disks 122 properly assembled with the frame member 46. This arrangement is shown in detail in Figure 7. The bolt 130 has a tapered head 131 and this head is disposed in the path of the levers 126. Thus when the cross head 115 is moved to the extreme position shown by full lines in Figure 4 the tapered head 131 will be received within the recess 129 and act to shift the short arms of levers 126 as shown in Figure 7, thereby swinging the fingers 127 within the slots 128 substantially in the direction of the length of the housings 121.

The free end of each needle housing has an arcuate extension 132 which can be formed by cutting away a part of the end of the housing through approximately 180°. A cross member 133 is secured in the tubular housing near this projecting portion or guide and slidably mounted therein is a rod 134 one end of which is secured to a needle 136 in the form of a rod slidable in the tubular housing 121. To the other end of the rod 134 is secured a disk 137 constituting a jaw, this disk being preferably formed with teeth or serrations 138 in that face thereof nearest the needle. A spring 139 is located in the housing 121 and thrusts at one end against the cross member 133 and at its other end against the needle 136. Thus the needle is held normally pressed back to the position shown in Figure 6 and jaw 137 is normally positioned at the inner end of the guide extension 132 and within the tubular housing 121 close to the terminal shoulder 140 located at the inner end of the guide extension 132. Thus it will be seen that when the cross head 115 reaches the extreme position shown by full lines in Figure 4 the levers 126 will be shifted by the wedging or tapered head 131, thereby causing the fingers 137 to thrust the needles 130 longitudinally and move the jaws 137 away from the shoulders 140 and to the outer ends of the guide extensions 132. See Figure 7.

Pivotally connected to the frame member 46 at points above and below the yoke 85 are coupling levers 141. Each of these levers extends through a slot 142 in the frame member 46 and is connected to said frame member by a finger 143 mounted in an ear 144 located at one end of the slot and extended from the frame member 46 toward the press body 40. When the lever 141 is in one extreme position it bears against one end wall of the slot 142 as shown in Figure 11 and extends at right angles from frame member 46 into the side portion of the baling press body 40. The other end of lever 141 has a tapered head 145 adapted to be engaged and held by a latch 146 pivotally mounted on one side of the yoke 85. A finger 147 is extended from one end of the latch and is engaged by one end of a coiled spring 48 the other end of which is connected to a finger 149 extending from lever 141 close to the head 145. Latch 146 has a wing 150 extending from the head thereof and supported close to the cross head 87. This wing has a shoulder 151 adapted, when the head of the latch 146 is in its innermost position, to engage back of the cross head 87 and hold it and the arm 86 against sliding movement under the action of the spring pressed plungers 78. This position of the parts is only possible when the latch 146 is out of engagement with the head 145 of lever 141 as shown in Figure 10. At this time lever 141 is held against movement by the presure thereagainst of compressed hay or the like exposed through the open side of the body 40 of the baling press. This material under compression has been indicated generally at 152 in Figure 10.

Extending from the frame member 46 adjacent the levers 103 are wings 153 each of which has a guide slot 154. A yoke 155 is slidably mounted between these wings and has laterally extending bolts 156 extending through the slots 154 so that the yoke can be slid longitudinally of the slots without swinging relative to the wings. One of the bolts extending through each wing carries a roller 157, this roller being reinforced by a bracket 158 mounted on both of the bolts 156, as shown in Figure 14. Rods 159 are fastened to the base portions 160 of the wings and are slidably engaged by the intermediate portion of the yoke 155. Springs 161 are mounted on these rods and serve to hold the yoke 155 normally pressed yieldingly away from the bases 160 of the wings. Carried by the yoke between the rods 159 is a block 162 having a stem 163 fastened in the yoke. The rollers 157 are so located that when the levers 141 are thrust to the positions illustrated in Figure 10 by pressure of compressed material 152 thereagainst, the fingers 149 will bear against said rollers 157 and slide the yoke 155 toward the frame member 46 against the action of the springs 161.

Journaled at one side of the baling press is a drive shaft 164 connected by a universal joint 165 to a square shaft 166 which extends through the yoke 155 between the springs 161, through an opening 167 in the arm 86 and through the sleeve 81. This sleeve is adapted to rotate with the shaft 166. It will be noted that the cross head 87 is cut away at 167 (see Fig. 12) to permit rotation thereof and thus it will be seen that while the shaft 166 is extended through the mechanism carried by the frame member 46, it can rotate freely therein, operating solely the sleeve 81 and the parts controlled thereby. A short worm 168 is secured to the shaft 166 at a point adjacent the wall 41 of the compression chamber. The location of this worm is such that when the frame member 46 reaches the position shown in Figure 1 with the levers 141 held as shown in Figure 10, the block 162 will be in engagement with the worm 168.

For the purpose of holding the frame member 46 and the parts associated therewith normally positioned as in Figure 1 cables 169 are attached to the outer ends of the respective levers 103 and are guided over sheaves 170. These cables are securely fastened at one end as shown at 171 and provide depending loops 172 which support movable weights 173. These weights are sufficiently heavy to pull through the cable 169 upon the frame member 46 so as to cause it to travel from the position shown for example in Figure 3 to the position shown in Figure 1.

Cooperating with the mechanism thus far described is a dividing block 174 adapted to be placed within the baling press for the purpose of separating adjacent bales in the process of formation. One of these blocks is to be placed in the machine after the material of each bale has been compressed to produce a bale of the desired size. Each block is provided with slots arranged in pairs, the slots of each pair being provided for each pair of needles. The slots, which have been indicated at 175, are extended into opposed faces of the block and throughout the length of the block from one side to the other. The innermost portion of each of the slots is substantially cylindrical as shown at 176 so that the tubular housings 121 of the needles can be received thereby. Obviously these slots are located where the needles can be moved thereinto after the block 174 has been properly coupled to the frame member 46. A recess 177 is formed in one side of the block near each pair of slots 175 and is located where it will receive one of the levers 141 when the block is brought to proper position relative thereto.

Rollers 178 are mounted on the wall 41 adjacent the worm 168 for engagement by the levers 103 as shown in Figure 1.

Normally the various parts of the apparatus are located as in Figure 1. At this time the levers 103 are locked in alinement. They are in contact with the rollers 178 against which they have been pulled by the weighted cables 169. After coming into contact with the rollers, the levers 103 which normally diverge toward the rollers 178 while being pulled by the cables are straightened out because the worm 168 engages the depressed block 162 and pulls the frame member 46 toward the wall 41. As the rollers 178 restrain the outer ends of the levers 103, the inner ends of the levers will be advanced as the frame member 46 is pulled by the short worm 168. As the block 162 passes off of the end of the worm the two levers are brought into alinement and are locked against relative movement by the spring actuated bolt 106. Obviously at this time lever 141 is arranged as shown in Figure 10, the pressure of the compressed material at the open side of the body 40 being such as to cause finger 149 to maintain the yoke 155 and block 162 pressed inwardly. At this time the bolt 88 is seated in the opening 101 in slide 100, said slide pressing against the block or slide 80 to hold the gears in neutral position. Consequently the continuously rotating shaft 166 will not cause the actuation of gear 84.

After an amount of material sufficient to form a bale has been compressed within the body 40 a dividing block 174 is placed between said material and the plunger (not shown) and forced longitudinally of the machine. As this block comes to position beside the frame member 46, the two levers 141 will pass off of the compressed material and be free to swing inwardly into the respective recesses 177, this swinging action being produced by the pressure of the rollers 157 against the fingers 149. As soon as the inner ends of the levers enter the recesses 177 the heads 145 snap into engagement with the heads of latches 146, this movement of the levers being accelerated by the springs 148. The latches will thus hold levers 141 against the adjacent walls of the slots 142 and as the block 174 is advanced by the further actions of the baler plunger, one end wall of each recess 177 will come against the adjacent lever 141. As the levers are held against movement about their pivots because of their engagement by the latches 146, it will be obvious that as the block 174 continues to advance, the end walls of the recess 177 will thrust against the levers 141 and push the frame member 46 therewith. Consequently this frame member, and all of the parts carried thereby, will be moved along the guideways 45 and 43 in unison with the block 174. The resistance to this movement offered by the weighted cables 169 will be sufficient to shift the slide 80 within the recess 76 so that the gears 83 and 84 will be brought into mesh.

As the gears 82 and 83 are constantly rotating this action will result in the rotation of the screw 71, causing the cross head 115 to feed toward the frame member 46 and the needles with their housings 121 to enter the cylindrical portions 176 of the slots 175. After the free ends of the needles have passed transversely through the block 174, the levers 126 come against the spreading head 131 so as to force the needles 130 longitudinally within the housings 121 and move the jaws 137 away from the shoulders 140. See Figure 7. At the same time the deflecting finger 114 comes against the lever 112 in the path thereof and actuates it to retract the bolt 106 from notch 104. This immediately breaks the joint between the levers 103 so that said levers can swing forwardly under the action of the weighted cables against stops 179 supported in the paths thereof. These stops thus constitute fulcrums for levers 103 so that they act to press backwardly through the slide 100 against the slide 80, overcoming the action of the spring pressed plungers in the path of slide 80 and moving gear 83 out of mesh with gear 84. This operation will also bring gear 82 into mesh with gear 84. The rotation of screw 71 will therefore be reversed and the cross head 115 will be moved back from the position shown in Figure 4 by full lines to the dotted line position. As the cross head reaches this outermost position it will thrust against the block 95, as shown in Figure 13, thereby imparting a short longitudinal movement to the shifting bar 91. When the levers 103 thrust backwardly against the slides 100 and 80, they also thrust the head 90 and the parts associated therewith backwardly so as to receive the foot 92 of the shifting bar 91 between head 90 and the arm 86. In other words the head 90 will be thrust back from the position shown in Figure 8 so as to extend across the foot 92 substantially as shown in Figure 11. Thus when bar 91 is pulled longitudinally as already explained the head 90 will be shifted thereby to the positions shown in Figures 11 and 12. This produces two operations. First, the ends of the cross head 87 come against the wings 150 of the latches 146 so as to disengage said latches from the heads 145 of levers 141. Second, the bolt 88 is withdrawn from the opening 101. As soon as levers 141 are released from the latches 146 the pulling action of the weighted cables 169 will slide the frame member 46 and the parts carried thereby back to their initial positions, lever 141 at this time dragging along the adjacent side of the compressed material 152 and holding the rollers 157 and yoke 155 pressed laterally as shown in Figure 10. When the bolt is withdrawn as explained the slide 100 will be released so that the pulling action of the cables 169 on levers 103 will result in the exertion of a backward pressure on slide 80 to maintain the gears in neutral positions. They will hold these positions as the block 162 on the depressed yoke 155 comes into engagement with the worm 168. It might be stated at this point that this movement of the slide 100 is limited because the latches 146 engage the cross head 87 at the shoulders 151 as shown for example in Figure 10. As soon as the levers 103 come against the stop rollers 178 the worm engages the depressed block 162 and pulls the frame member 46 so as to straighten out the levers and cause them to lock as in Figure 9. Thus the parts are reset and the operation already described can be repeated.

The mechanism thus far described constitutes the means for controlling the actuation of the needles. Each pair of needles cooperates with a twisting mechanism, one complete mechanism being provided for each pair and each being a duplicate of the other. These twisting mechanisms have been designated generally at T in Figure 4 wherein the needles are shown in projected positions in engagement with the twisting mechanisms. One gear 67 is provided for each of these mechanisms so that when the shaft 62 and the parts driven thereby are set in motion by the rotation of gear 69, both of the mechanisms T will be operated simultaneously. Thus two tying actions will occur at the same time where two sets of needles are used but obviously, where more or less than two sets of needles are used the number of tying mechanisms will be correspondingly increased or reduced. As both tying mechanisms are the same a description of one will suffice.

Carried by that portion of the frame 47 directly opposite the frame member 46 is a small table 180 located between said frame and the adjacent side of the body structure 40. A guide sheave 181 is journaled on the outer portion of this table for the purpose of guiding a tie wire W to the twisting mechanism. An arcuate blade 182 having a base 183 is mounted on the table close to the sheave 181 and is held adjustably in position by means of bolts 184 extending through slots 185. This blade is positioned to receive the free end portion of one of the needles and its housing when said needle is at its extreme projected position. A groove 186 is formed diagonally with the top face of the table and extends from a point beneath the free cutting edge 187 of the blade 182. A recess 188 extends into the table under this cutting edge 187 where it merges into one end of the groove 186. The other end of the groove communicates with a depression 189 formed in the top of the table and a bearing stud 190 projects from the table at a point between recess 188 and depression 189. Depending from the table below the inner portion of the depression 189 is a hanger including a pair of channeled guides 191.

Journaled in the lower end portions of the channeled members 191 is a shaft 192 provided, at one end, with a gear 193. To this same shaft is secured a cam 194 with which cooperates a pair of oppositely disposed slides 195 and 196. The inner side of the slide 195 has a projecting lug 197 which overhangs a similar lug 198 formed on the inner side of the slide 196. Thus the slide 195 can move upwardly between the hangers independently of the slide 196 but should the slide 196 be thrust upwardly by the cam 194 the projecting lug 198 would come against lug 197 and cause both slides to lift. Springs 199 bear downwardly on the respective slides so as to hold them normally pressed downwardly on the lifting cam. Slide 196 has a blade 200 fixedly attached thereto and formed with a laterally extending tongue 201 which, as shown in Figure 17, is normally extended under the ears of the needles and their housings. Mounted on the blade 200 at the upper edge thereof and above the slide 196 is a guide sheave 202 for engagement by the tie wire W.

Journaled in the table between one edge thereof and the depression 189 is a stem 203 provided at its outer end with a gear 204 and at its inner end with a tapered head 205. This stem has a longitudinal groove 206 which extends through the gear 204 and the head 205, the groove being of such depth as to extend inwardly slightly past the access of rotation of the gear and the stem. The groove in this stem normally alines with the groove 186 in the table 180 and extending upwardly from the table at one side of the grooved stem in a deflecting tongue 207. A deflecting block 208 is secured to the table at the other side of the stem 203 and this block cooperates with the tongue 207 to provide a wire receiving throat of substantially the same width as the width of the groove 206. Thus when a wire is pressed downwardly between the tongue 207 and the block 208 it will be guided accurately into the groove stem 203 so as to extend longitudinally thereof. Another longitudinally grooved stem 209 is journaled in the table at an acute angle to the stem 203, as shown particularly in Figure 17. This stem has a gear 210 at its outer end and a tapered head 211 at its inner end, this head, like the head 205, being extended into the depression 189. The groove 212 in the stem 209 intersects gear 210 and head 211 and the top of the table is slotted as at 213 to allow a tie wire to move downwardly into the groove 212 when the stem 209 is in its normal position. An intermediate gear 214 is journaled at one side of the table and is located between and meshes with the gears 204 and 210 so as to insure simultaneous rotation thereof.

The slide 195 has a rod 215 extending upwardly therefrom and guided through the table, there being a depressing finger 216 extended at an angle from the upper end of the rod. This finger is adapted to work across the end of the head 205. By providing this rod on the slide 195, it will be apparent that when the slides are pushed upwardly by the cam 194 the rod will also be elevated so as to bring the finger 206 above the level of the table top. Likewise, when the slides are thus elevated the blade 200 will be raised and the tongue 201 caused to pass a spring pressed latch 217 slidably mounted beneath the table. After the tongue 201 passes the latch, said latch will spring thereunder and support the slides and the parts connected thereto in their raised positions. A shaft 218 is mounted for rotation in the table and has a radial finger 219 which engages the latch 217 so as to retract it against the action of the latch spring 220. This shaft has a tripping finger 221 above the table 180, the finger being held by a spring 222 normally in the path of one of the needle housings.

A shaft 223 is journaled in the table and is extended at right angles to the stem 209. Extending from that end of the shaft nearest the stem is a crank arm 224 which merges into an arcuate finger 225 extending upwardly back of the table 180 and terminating in a fork 226. This fork is normally located above the back edge of the table and is adapted to travel through an arc extending from this position to a point close to and in front of the gear 210. This last position of the fork has been illustrated in Figure 31. A spring 227 is mounted on shaft 223 for holding the fork at its retracted or other extreme position as shown in Figure 17. When thus located the fork will not interfere with the lowering of a tie wire into the groove 186.

Secured to the finger 225 is a tripping block 228 adapted, during the forward swinging movement of the fork 226, to come against a crank arm 229 carried by a shaft 230 journaled on the table 180. Another arm 231 is extended from the shaft 230 at an angle to the arm 229 and has a laterally extending depressing finger 232 adapted to swing downwardly into the depression 189 when the arm 229 is swung upwardly by block 228. This depressing finger 232 is adapted to move downwardly to position substantially at right angles to the groove 212 in stem 209.

Shaft 223 has a gear 233 which meshes with a gear 234 secured to a short shaft 235 journaled in the table. Another gear 236 is secured to shaft 235.

Journaled on the stud 190 is a disk 237 provided with a concentric gear 238 which meshes with one of the gears 67. This disk has a circumferential flange 239 providing at opposite sides annular seats 240 and 241 respectively. This flange and the seats are intersected by a recess 242 extending into the periphery of the disk and producing overhanging tongues 243 and 244 at the ends of the flange. One end of the seat 241 is enlarged as at 245 to carry a bearing pin 246 on which is pivotally mounted a dog 247 overhung by the tongue 243. A spring 248 bears against this dog and holds its free end normally in engagement with a star wheel 249 journaled as at 250 on the inner side of the disk 237. This star wheel includes four teeth arranged in pairs, the teeth 251 of one pair being oppositely disposed and equally spaced from the teeth 252 of the other pair. All of the teeth are sufficiently broad to engage and lift the dog 247 but the outer ends of the teeth 251 are cut away at one side as shown at 253 while the outer ends of the other teeth 252 are cut away as shown at 254.

For the purpose of actuating the star wheel a tripping pin 255 is extended from the table 180 into the path of the wheel. Mounted for rotation in the seat 241 is a ring 256 having an annular seat 257 and provided on its face with a ring gear 258. This ring gear meshes with the gear 204 so that during one complete rotation of the ring gear several revolutions of the gears 204 and 210 will be produced.

That face of the ring 256 opposite the ring gear has a short annular recess 259 one end of which terminates in a shoulder 260 while the other end is inclined as shown at 261. See Fig. 28. The depth of this recess 259 is sufficient to receive the adjacent sides of the teeth 252 at certain times during the operation of the mechanism. The annular seat 257 receives the inwardly extended flange 262 of an outer ring 263 lapping the periphery of the ring 256 and the flange 239. A retaining ring 264 is mounted for rotation on the seat 240 and is fastened to the ring 263 so as to rotate therewith relative to disk 237 and ring 256. This retaining ring has a portion of its inner periphery cut away as shown at 265 so that during a portion of the operation of the mechanism the outer sides of the teeth 253 will be free to extend thereinto. This recess 265 is adapted, at a predetermined time during the rotation of the parts 264 and 263 to come to position opposite an inturned head 266 provided at one end of an arm 267. This arm extends across the periphery of the ring 263 and is looped to provide a dog 268 for engagement with the gear 258 as shown in Figure 29. A rod 269 is extended from this dog and slidably mounted in the table 180, there being a spring 270 on the rod for holding the dog 268 normally disengaged from the gear 258. Disengagement of these parts is prevented during most of the rotation of ring 264 because the head 266 slidably engages said ring. When, however, the recess 265 comes opposite head 266, said head can be shifted thereinto by spring 270 so as thus to uncouple the dog 268 from the gear 258. A short peripheral gear 271 is carried by the ring 263 and is adapted, on the completion of one half revolution of ring 263, to engage and rotate gear 193 of the cam 194 while during the completion of the second half of the revolution of ring 263 the peripheral gear 271 will engage and rotate gear 236 which controls the actuation of the finger 235. The ring 263 has a forked bracket 272 attached to the face thereof and this block is so located that, during the rotation of ring 239 the tie wire lying in the groove 186 will be picked up by the forked block and folded back as hereinafter explained. In practice the tie wire W is extended from a reel such as commonly employed and engages the sheaves 181 and 202 so as thus to extend under the cutting edge 187 of blade 182, longitudinally above the groove 186 and also longitudinally above the groove 206 in the stem 203. This wire W is extended transversely across the body structure 40 of the baling press and the end thereof is gripped between the jaw 137 and the shoulder 140 of one of the needles and its housing as shown in Figure 40. At this time the needles, the frame member 46, the frame 47, and the twisting mechanism are all in their initial positions as shown for example in Figure 1. The operation of the needles has already been explained. As the material being baled is compressed within the body structure 40 it will force the said compressed material longitudinally within said structure and relative to the needles during which time the levers 141 will be held back as shown in Figure 10. Thus the relative positions of the parts will gradually shift from those shown in Figure 40 to those shown in Figure 41 at which time the pull of the tie wire on the needle gripping the same will result in said needle shifting from the position shown in Figure 40 to the position shown in Figure 41. This shifting of the needles is permitted in view of the fact that the disks 118 and 122 carrying the same are rotatably mounted as shown in Figures 6 and 7. After the proper amount of material to form a bale has been compressed a new dividing block, which has been placed in the machine, comes to position opposite the needles as shown in Figure 41 whereupon the frame member 46 becomes coupled to said block, the needles are directed transversely through the block (see Figure 42), the free ends of the needles come to positions above the table 180 cooperating therewith and the jaws 137 of the needles are thrust to open positions as shown in Figure 7. At this time the needle which carries the wire W deposits the free end of said wire across the groove 186 and above the forked end 226 of the finger 225. This has been illustrated in Figure 44 which is a view more or less in diagram. As the wire extending from the reel and around the bale being formed is extended longitudinally along groove 186 it will be obvious that the released end of this wire will extend over that portion of the wire in the groove so that the parts will hold the relative positions shown in Figure 43. The other needle enters the space beneath the arcuate blade 182 so that the space between the jaw 137 and the shoulder 140 will be located directly above that portion of the wire extending between groove 186 and sheave 181. These positions of the parts have been shown in Figure 44. As soon as the needles reach these positions so that one of the needles opens to release the end of the wire as in Figure 42 and the other opens above the wire adjacent the cutting blade, the needles begin to return to their normal positions by the operation of the mechanism heretofore described. The closing of the needle adjacent the cutting blade 182 will result in the gripping of the wire W thereby and just as this wire is gripped, the motion transmitted from gear 69 to the shaft 66 and gear 77 will set in motion the tying mechanism. The gears are so proportioned that disk 137 will be given two revolutions by the time the needles are completely retracted to the positions shown by broken lines in Figure 4. This retraction of the needles takes place gradually as the block 174 which is coupled to the frame member 46 travels from the position shown in Figure 1 to the position shown in Figure 3. During the first revolution of this disk the dog 268 is in engagement with gear 258 so that said gear cannot rotate. At the same time one of the teeth 253 is projected into the recess 265 so that ring 264 is thus coupled to the disk 37. In other words as the disk rotates in the direction indicated by the arrow in Figures 28 and 35 the projecting tooth 253 will thrust against one end wall of recess 265 at 265' (see Figure 28) and as the star wheel is held against retrograde movement by the dog 247 it will be apparent that rotation of the disk 237 and ring 64 in unison will be insured. As the ring 263 is secured to and rotates with the ring 264 the rotation of these rings by gear 238 will result in movement of the forked bracket 272 so that it will come up under that portion of the wire W adjacent the blade 182 and press the wire beyond the point where it has been gripped by one of the needles so as to shear said wire upon the edge of blade 182. As the forked block continues to move upwardly and laterally with the ring 263 it bends the severed end portion of the wire back upon itself and over the previously released end of the wire so as to form a hook as shown at 273 in Figure 45. As the wire is thus folded to form the hook it is carried downwardly by the forked block 272 so as to press upon the finger 216 and enter the groove 206. Immediately following this operation the gear 271 engages gear 236 (see Figures 21 and 26) and imparts a partial rotation to said gear and to the gears 234 and 233. This rotation will be sufficient to swing the finger 225 upwardly from the position shown in Figure 42 to the position shown in Figure 31. Consequently the fork 226 will engage the free end of wire W thereabove and fold it forwardly and downwardly so as to position said end within the groove 212 in stem 209. In other words this end of the wire will be bent to form a hook 274 engaging the hook 273. See Figure 46. Following this operation, which occurs during the completion of one revolution of the ring 263 the recess 265 comes opposite the head 266 of dog 268 and spring 270 pulls the dog out of engagement with the gear 258. At the same time one of the teeth of the star wheel 249 comes against the pin 255 so that the wheel is rotating one tooth and the tooth 251 is shifted inwardly out of engagement with recess 265 while one of the teeth 252 is brought to outwardly projecting position after being snapped past the dog 247. Here this tooth 252 will enter the recess 259 in ring 256 with the result that said ring will be coupled to the disk 237 and rotate therewith during one revolution. As this ring rotates within the ring 263 which, with ring 264 is held by the head 266 in recess 265, the gears 204, 214 and 210 will be actuated so that those portions of the wires seated in the grooves in the stems 203 and 209 will be twisted. It might be stated that when the finger 225 moves to the position shown in Figure 31, the block 228 actuates arm 229 so as to force the finger 232 downwardly and direct the wire hook 274 into the groove 212. Consequently the simultaneous rotation of the two stems 203 and 209, will result in twisting the two hooks so as thus to produce interfitting links as shown at 275 in Figure 47. On the completion of this rotation of gear 258 and ring 256 the star wheel 251 will again be actuated by the pin 255 so as to uncouple ring 256 from the disk 237 and couple the rings 264 and 263 to said disk. Consequently the ring 263 will again begin its rotation during the first portion of which gear 271 will engage and rotate gear 193 to actuate cam 194 and thereby raise the slides 195 and 196 and subsequently release them. This will cause the tongue 201 to press upwardly against those portions of the wires projecting outwardly from the gears 204 and 210 so as to lift them out of the grooves 206 and 212. Consequently the tie is thus completed and will extend tightly around the formed bale. While this operation has been going on the needles have been retracted from the block 174 coupled to the frame member 46 and the severed end portion of the wire on the reel has been drawn back to the position illustrated in Figure 48. Thereafter, as explained in connection with the operation of the needle mechanism, the frame member 46 is brought back to the position shown in Figure 1, the positions of the needles are reversed as heretofore described in connection with Figures 40 and 41, another dividing block is placed in position and the operation already described will be repeated.

It might be added that after the finger 225 has been swung to the position shown in Figure 31 and the member 236 has moved out of mesh with gear 231, the spring 227 will return the arm 225 to its initial position shown in Figure 42 and the fork 226, striking against the arm 229, will restore the parts 231 and 232 to their initial positions.

When the blade 200 with its tongue 201 is lifted to disengage the wires from the twisting gears, the finger 216 is also raised for the purpose of lifting the interfitting links out of the heads 205 and 211.

What is claimed is:

1. In a baling press a press body, a dividing block mounted for movement therein, tying mechanism, and means controlled by the block for coupling said mechanism to the block for movement therewith and for releasing the tying mechanism for operation.

2. A baling press including a body structure, a dividing block mounted for movement therein, tying mechanism movable longitudinally of the body structure, means for coupling said mechanism to the dividing block for movement therewith in one direction and for releasing the tying mechanism to convey a tie wire through the dividing block, tie the wire, sever the tied wire, and return the tying mechanism to its initial position relative to the dividing block.

3. In a baling press the combination with a body structure and a dividing block mounted for movement therein, of tying mechanism movable longitudinally of said body structure, means for automatically coupling said mechanism to the block for movement in one direction therewith and for releasing the tying mechanism for movement through a cycle of operations to tie a wire about the formed bale during the compression of material of another bale against the block, means for automatically uncoupling the tying mechanism from the block after the completion of the tying operation, and means for automatically shifting said mechanism longitudinally of the body structure to normal position independently of the block when uncoupled therefrom.

4. In a baling press a body structure, a dividing block mounted for movement therein, a frame structure movable longitudinally of the body structure, needle mechanism carried by one side portion of the frame structure, twisting mechanism carried by the other side portion of said frame structure, means for automatically coupling the frame structure to the dividing block for movement therewith during the compression of material against the block, a continuously operating driving element, and means controlled by the block for coupling the needle and twisting mechanisms to the driving element to successively position a tie wire about a bale being formed and twist the wire and thereafter restore the needle mechanism to its initial position, said operations taking place while the frame structure is coupled to the dividing block.

5. In a baling press the combination with a body structure and a dividing block movable therein by material being compressed, of a frame structure, means for automatically coupling said structure to the block for movement therewith, needle mechanism carried by one side portion of the frame structure, twisting mechanism carried by the opposite side portion of the frame structure, a continuously operating driving element, means released by the dividing block while coupled to the frame structure for automatically connecting the needle mechanism to the driving element thereby to rotate the needle mechanism to bring it into operative connection with the piston mechanism and to withdraw it therefrom while the frame structure is coupled to the dividing block, means controlled by the needle mechanism for uncoupling the frame structure from the dividing block after the completion of the tying operation, and means for automatically returning the frame structure to its initial position when uncoupled from the block.

6. The combination with the body structure of a baling press and a dividing block movable therein by material being compressed, of bale tying mechanism including a frame structure, means for automatically coupling said structure to the dividing block for movement therewith, tubular needle housings supported by the frame structure at one side thereof, longitudinally shiftable needles within the housings, means upon the needles and housings for gripping a wire interposed therebetween, twisting mechanism at the opposite side of the frame structure, means for automatically moving the needles and their housings through the block into operative connection with the twisting mechanism and thereafter withdrawing the needles and the housings from the block, and means controlled by the movement of the needles for uncoupling the frame structure from the block.

7. In a baling press the combination with a body structure, of a frame structure movable longitudinally thereof, twisting mechanism carried by the frame structure adjacent one side of the body structure, and needle mechanism carried by the frame structure adjacent the other side of the body structure, said needle mechanism including a cross head, guides therefor, a pair of tubular needle housings connected to the cross head and mounted for free rotation about an axis extending therebetween, a needle slidable within each housing, a jaw carried by each needle for cooperation with its housing to grip a tie, means for holding the jaws yieldingly in gripping positions, means for actuating the cross head to project the needles and their housings through the body structure into operative positions relative to the tying mechanism, and means controlled by the movement of the cross head for shifting the needle jaws to tie releasing positions while in operative engagement with said twisting mechanism.

8. In a baling press the combination with a body structure and a dividing block mounted for movement therein by pressure of material, of a frame structure movable longitudinally of the body structure, twisting mechanism at one side thereof, needle mechanism at the other side thereof weighted means for holding the frame structure normally in one position, means for automatically coupling the frame structure to the dividing block for movement therewith, a drive shaft slidably engaged by the needle mechanism, means controlled by the coupling of said frame structure to the block for operatively connecting the drive shaft to the needle mechanism to drive said mechanism in one direction, and means controlled by the movement of the mechanism for automatically reversing said movement when the needle mechanism is brought to a predetermined position relative to the twisting mechanism.

9. In a baling press the combination with a body structure and a dividing block movable therein by pressure of material thereagainst, of a laterally movable cross head, guides therefor extending from the frame structure, a feed screw engaging the cross head, a drive shaft, reversing gears actuated by the drive shaft and shiftable relative thereto, means for automatically coupling the frame structure to the dividing block, means controlled by said coupling action for shifting the gears to drive the feed screw in one direction to shift the cross head, means controlled by the movement of the cross head for shifting the gears to reverse the operation of the feed screw, and needles carried by the cross head and movable thereby transversely of the body structure.

10. In a baling press the combination with a body structure and a dividing block movable therein by pressure of material thereagainst, of a laterally movable cross head, guides therefor extending from the frame structure, a feed screw engaging the cross head, a drive shaft, reversing gears actuated by the drive shaft and shiftable relative thereto, means for automatically coupling the frame structure to the dividing block, means controlled by said coupling action for shifting the gears to drive the feed screw in one direction to shift the cross head, means controlled by the movement of the cross head for shifting the gears to reverse the operation of the feed screw, means controlled by the movement of the cross head for uncoupling the frame structure from the dividing block, means for automatically shifting the frame structure to initial position when uncoupled from the dividing block, and means controlled by said shifting of the frame structure for moving the gears to neutral position, and needles carried by the cross head and movable thereby transversely of the body structure.

11. In a baling press the combination with a body structure and a dividing block movable therein by pressure of material thereagainst, of a laterally movable cross head, guides therefor extending from the frame structure, a feed screw engaging the cross head, a drive shaft, reversing gears actuated by the drive shaft and shiftable relative thereto, means for automatically coupling the frame structure to the dividing block, means controlled by said coupling action for shifting the gears to drive the feed screw in one direction to shift the cross head, means controlled by the movement of the cross head for uncoupling the frame structure from the dividing block, means for automatically shifting the frame structure to initial position when uncoupled from the dividing block, threaded means for shifting and holding the frame structure while in normal position, thereby to reset the shifting means, means controlled by the coupling of the frame structure to the dividing block for releasing it from said threaded means, and needles carried by the cross head and movable thereby transversely of the body structure.

12. In a baling press the combination with a body structure and a frame embracing the same and extending transversely thereof, of needle mechanism including needles movable transversely of the body structure, said mechanism being carried by one side portion of the frame structure, means at the other side of the frame structure for guiding a tie wire to the body structure, means carried by one of the needles for depositing the end of the tie wire across that portion of the wire adjacent the guiding means, means carried by the other needle for gripping the tie wire adjacent the guiding means, means for automatically severing the gripped portion of the tie wire, separate means for looping the ends of the severed tie wire to provide interfitting loops, and means for simultaneously twisting the tie wire to close the loops and complete the tie.

13. In a bailing press the combination with a pair of needles mounted for reciprocation, of a table, means for guiding a tie wire across the table, said wire being engaged at its free end by one of the needles, means for actuating the needles to deposit the end of the tie wire across a portion of the wire on the table and bring one of the needles into position for engaging a portion of the tie wire on the table, means for automatically severing the engaged portion of the tie wire, means for retracting the needles to draw the gripped portion of the tie wire from the table, separate means for looping successively the respective ends of the severed portions of the tie wire to produce interfitting loops, and means for twisting portions of the tie wire to close the loops and form interfitting eyes.

14. In a baling press the combination with a table for supporting a tie wire, of a needle for pulling the free end of the tie wire to position upon the table and across that part of the wire thereon, a needle for gripping a portion of the wire adjacent the table and pulling it from the table, means for automatically severing said crossed portion of the tie wire from the needle engaged portion, separate means for successively looping the ends of the crossed portion of the tie wire to provide interengaging loops, twisting gears having grooves for receiving portions of the respective loops, means for simultaneously actuating the gears to twist the wire and close the loops thereby to form interfitting eyes, and means for stripping the eyes from the twisting gears.

15. In a baling press the combination with a table and a needle for depositing the end portion of a tie wire across another portion thereof on the table, of grooved twisting gears, means for severing the wire, means movable in a circle for picking up the bottom or severed end portion of the wire and folding it over the deposited end of the portion, means movable in an arc for picking up the deposited end portion of the wire and folding it over the folded end of the severed portion, means for depressing the folded end portions of the wire into the respective grooved twisting gears, and means for rotating said gears to twist the engaged portions of the wire and produce interfitting eyes.

16. In a baling press the combination with a table and a needle for depositing the end portion of a tie wire across another portion thereof on the table, of grooved twisting gears, means for severing the wire, means movable in a circle for picking up the bottom or severed end portion of the wire and folding it over the deposited end of the portion, means movable in an arc for picking up the deposited end portion of the wire and folding it over the folded end of the severed portion, means for depressing the folded end portions of the wire into the respective grooved twisting gears, means for rotating said gears to twist the engaged portions of the wire and produce interfitting eyes, and means for engaging the wire at opposite ends of the twisting gears for stripping the wire from the gears.

17. In a baling press the combination with a table, grooved twisting gears angularly disposed on the table, and means for guiding a tie wire across the table above one of the gears, of a pair of needles, means for actuating one of the needles to convey the free end of the tie wire to the table after being looped about a bale and deposit it across that portion of the wire on the table, means for severing the crossed portion of the wire, the two needles being movable together, the other needle constituting means for picking up and conveying the end portion of the wire from which the crossed tie has been severed, means for picking up the lower end portion of the severed tie and folding it over the deposited end portion to form a loop, means for picking up the deposited end of the tie and folding it over the previously formed loop, means actuated by the last named pick-up means for depressing both of the loops into the respective twisting gears, and means for actuating the twisting gears to close the loop and produce interfitting eyes.

18. In a baling press the combination with a body structure and a frame structure movable longitudinally thereof and embracing the same, of needles movable with the frame structure, means for simultaneously shifting the needles transversely of the body structure, means carried by one of the needles for gripping one end of the tie wire extending about a formed bale and conveying it across the body structure and across a portion of the tie wire at the far side of the body structure, means for severing the tie wire at the far side of the body structure, means carried by the other needle for gripping the end of the tie from which the tie was severed and drawing it across the body structure, means carried by the frame for folding the severed end of the tie wire over the deposited end thereof to form a loop, means for folding the deposited end of the tie wire over said loop to produce a second loop, separate twisting gears having wire receiving grooves, means operated by the formation of the second loop for depressing the two loops into the respective twisting gears, means for rotating the twisting gears to close the loops and form interfitting eyes, and means for stripping the tie from the gears.

19. In a baling press a press body, a dividing block mounted for movement therein, a frame structure extending around and spaced from the press body, a rail extending longitudinally of the press body, a carriage movable therealong, a universal connection between the frame structure and carriage, tying mechanism carried by the frame structure, means for automatically coupling the carriage to the dividing block, a continuously operating drive element, and means released by the coupling of the carriage to the dividing block for coupling the tying mechanism too the drive element.

20. In a baling press the combination with a body structure, of a tubular housing, a needle within and movable longitudinally of the housing, cooperating means upon the needle and one end of the housing for gripping a tie wire, means for shifting the housing and needle transversely of the body structure to convey a portion of a gripped tie wire across said structure, and means for automatically releasing the gripped portion of the tie wire when the housing and needle reach a predetermined position.

In testimony that I claim the foregoing as my own, I have hereto affixed my signature.

HUGH RICHARDSON.